(12) United States Patent
Zeitzschel

(10) Patent No.: US 6,311,897 B1
(45) Date of Patent: Nov. 6, 2001

(54) PASSIVE PULSE GENERATOR AND METHOD FOR ACTIVATING A FITTING WITH A PASSIVE PULSE GENERATOR

(75) Inventor: Günter Zeitzschel, Frankfurt am Main (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/365,521

(22) Filed: Aug. 2, 1999

Related U.S. Application Data

(63) Continuation of application No. PCT/EP98/00263, filed on Jan. 19, 1998.

(30) Foreign Application Priority Data

Jan. 31, 1997 (DE) .............................................. 197 03 660

(51) Int. Cl.[7] .................................................... G05D 23/02
(52) U.S. Cl. .................... 236/101 D; 376/282; 376/283; 376/277; 376/336; 376/337; 137/79; 137/78.1
(58) Field of Search ............... 137/78.1, 79; 236/101 D; 376/277, 282, 283, 336, 337

(56) References Cited

U.S. PATENT DOCUMENTS

| | | | |
|---|---|---|---|
| 4,227,646 | * 10/1980 | Hart et al. .............................. | 236/93 |
| 4,848,653 | * 7/1989 | Van Becelaere ..................... | 236/49.3 |
| 5,261,597 | * 11/1993 | Perlman et al. ........................ | 236/93 |
| 5,400,961 | * 3/1995 | Tsutsui et al. ..................... | 236/12.12 |
| 5,417,367 | * 5/1995 | Baclet et al. ........................ | 236/93 R |
| 5,684,846 | * 11/1997 | Meneely et al. ..................... | 376/293 |

FOREIGN PATENT DOCUMENTS

| | | | |
|---|---|---|---|
| 2250380 | 4/1973 | (DE) . | |
| 3500662A1 | 7/1986 | (DE) . | |
| 3600244A1 | 9/1986 | (DE) . | |
| 4021580C1 | 4/1991 | (DE) . | |
| 19517655A1 | * 11/1996 | (DE) .............................. | F16K/17/04 |
| 0058451A1 | 8/1982 | (EP) . | |
| 2690219 | 10/1993 | (FR) . | |
| 2056677A | * 3/1981 | (GB) .............................. | G01K/11/00 |
| 2209200A | 5/1989 | (GB) . | |

* cited by examiner

Primary Examiner—Michael J. Carone
Assistant Examiner—John Richardson
(74) Attorney, Agent, or Firm—Herbert L. Lerner; Laurence A. Greenberg; Werner H. Stemer

(57) ABSTRACT

A passive pulse generator can be connected to a line in order to activate a safety fitting in a nuclear power plant. The line can be closed by a closure element. In the event of a temperature change in the vicinity of the pulse generator, the closure element is actuated solely as a result of a thermal volume change of an actuating element, so that the line is released. The pulse generator therefore activates the fitting passively, without additional control pulses. A method for activating a fitting with a passive pulse generator is also provided.

7 Claims, 2 Drawing Sheets

PASSIVE PULSE GENERATOR AND METHOD FOR ACTIVATING A FITTING WITH A PASSIVE PULSE GENERATOR

CROSS-REFERENCE TO RELATED APPLICATION

This application is a continuation of copending International Application No. PCT/EP98/00263, filed Jan. 19, 1998, which designated the United States.

BACKGROUND OF THE INVENTION

FIELD OF THE INVENTION

The invention relates to a passive pulse generator and to a method for activating a safety fitting in a nuclear power plant.

In a nuclear power plant which is equipped, for example, with a pressurized or boiling water reactor, cold coolant is fed to and heated coolant is discharged from a reactor pressure vessel in a closed circuit in a reactor safety vessel. The coolant is heated by core processes taking place in the reactor pressure vessel. Heat energy that is absorbed at the same time by the coolant serves for generating electric energy. At the same time, the heated coolant is cooled through the use of heat exchange processes and is fed to the reactor pressure vessel again. A leak in that closed cooling circuit leads to a reduction in the coolant and therefore to a temperature rise in the reactor pressure vessel. A temperature rise in the reactor pressure vessel also leads automatically to a temperature rise, for example in a condensation chamber, to which the reactor pressure vessel is connected for safety reasons. At present, however, a small leak in the coolant circuit is not detected. Instead, the coolant loss which occurs is compensated automatically by regulating a filling level of the reactor pressure vessel from existing coolant reservoirs. However, should a major coolant loss incident occur, in that case the temperature in the reactor safety vessel would be increased by the amount of the temperature rise due to the leak.

Published French Patent Application 2 690 219 discloses a safety fuse which releases a valve when a temperature is exceeded. The disadvantage of a safety fuse is that it is available only once and, after use, has to be replaced by a new one.

Published UK Patent Application GB 2 209 200 A discloses a thermal closing valve that, particularly in the domestic sector, is used for fire protection reasons in gas lines in which an easily flammable or explosive gas flows. The closing valve closes the gas line reliably and permanently when a specific temperature is exceeded. For that purpose, a special spring is provided and closing of the gas line is brought about by thermal expansion of the spring in reaction to a temperature rise. The spring is specially constructed so that the gas line still remains closed even when the temperature falls again. The spring therefore does not return to its initial position in the event of a lowering of temperature. On the contrary, it has to be replaced by a new spring, in order to ensure that the closing valve is operative again.

SUMMARY OF THE INVENTION

It is accordingly an object of the invention to provide a reversibly operating passive pulse generator which reacts to a temperature change and a method for activating a fitting with a passive pulse generator in which a control pulse for the fitting is released as a result of a temperature change, which overcome the herein afore-mentioned disadvantages of the heretofore-known devices and methods of this general type.

With the foregoing and other objects in view there is provided, in accordance with the invention, in a nuclear power plant having a safety fitting and a pressure-carrying line connected to the safety fitting, a passive pulse generator to be connected to the line for activating the safety fitting, the passive pulse generator comprising a closure element for reversibly opening and closing the line; a first actuating element generating a force effect as a result of a thermal volume change of the first actuating element, the first actuating element supplying the force effect for actuating the closure element; and a locking device releasing actuation of the closure element by the first actuating element when the force effect caused by the thermal volume change exceeds a predeterminable value.

Therefore, in the event of a temperature change in the vicinity of the pulse generator, the result of the expansion or contraction of the first actuating element is that, for example, the closure element releases the pressure-carrying line. The medium, for example compressed air, which is located in the line, may then be used as a signal for a downstream fitting. This operation is reversible, so that the pulse generator can transmit a signal as often as desired, in order to initiate further steps, for example in order to rectify a coolant loss in a reactor safety vessel. The locking device is constructed in such a way that the value of the force effect beyond which the locking device is to be released can be set. The temperature beyond which the pulse generator is triggered and transmits a signal can consequently be set indirectly. An essential point for the safety requirements in a nuclear power plant is the passive functioning of the pulse generator. The pulse generator transmits a signal to a downstream fitting solely in reaction to a temperature change in the vicinity. No other external control signals, for example electric control signals, are necessary. The passive pulse generator is therefore fully operational even in the event of a complete power failure.

Devices which, in principle, have features similar to the pulse generator are known in various versions, for example from German Published, Non-Prosecuted Patent Application DE 195 17 655 A1 or from German Patent DE 40 21 580 C1. They are used, for example, in heating technology, as thermostats. However, those thermostats or valves differ fundamentally from the pulse generator in terms of both their functioning and their structure. They are therefore in no way suitable for use in the highly sensitive safety sectors of a nuclear power plant for activating a fitting and not even for achieving objects specific to power stations.

In accordance with another feature of the invention, the first actuating element is constructed as a memory pressure element. The advantage of a memory pressure element is that its thermal volume change commences essentially only beyond a specific temperature, but then virtually in a jump. Therefore, through the use of such a memory pressure element, the temperature beyond which the pulse generator is to be triggered can be set.

In accordance with a further feature of the invention, in the pulse generator, the first actuating element is held in a basic position by the locking device. The closure element is therefore exposed to a force effect only when the predetermined value for the temperature is exceeded. This increases the operating reliability and prevents the pulse generator from being triggered prematurely.

In accordance with an added feature of the invention, for the same purpose, the closure element is capable of being closed with an adjustable closing force through a second actuating element.

With the objects of the invention in view there is also provided a method for activating a safety fitting in a nuclear power plant with a passive pulse generator transmitting a signal through a pressure-carrying line to the fitting, which comprises generating a force effect from a thermal volume change of an actuating element in the pulse generator; actuating a closure element in the pulse generator with the force effect for reversibly opening and closing the pressure-carrying line; and releasing the actuation of the closure element by the actuating element with a locking device, when the force effect caused by the thermal volume change exceeds a predeterminable value.

In accordance with a concomitant mode of the invention, it is advantageous, in particular, to place a pulse generator, as described above, in a pressure chamber and/or condensation chamber of a nuclear power plant, so that the temperature, which has increased as the result of a coolant loss, in the reactor safety vessel and therefore also in the pressure chamber or condensation chamber, can be detected. It is particularly advantageous for the operation of a nuclear power plant, with a view to safety aspects, that the pulse generator be triggered passively. The pulse generator therefore releases the pressure-carrying line beyond a specific increased temperature, without additional control pulses being required.

Other features which are considered as characteristic for the invention are set forth in the appended claims.

Although the invention is illustrated and described herein as embodied in a passive pulse generator and a method for activating a fitting with a passive pulse generator, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
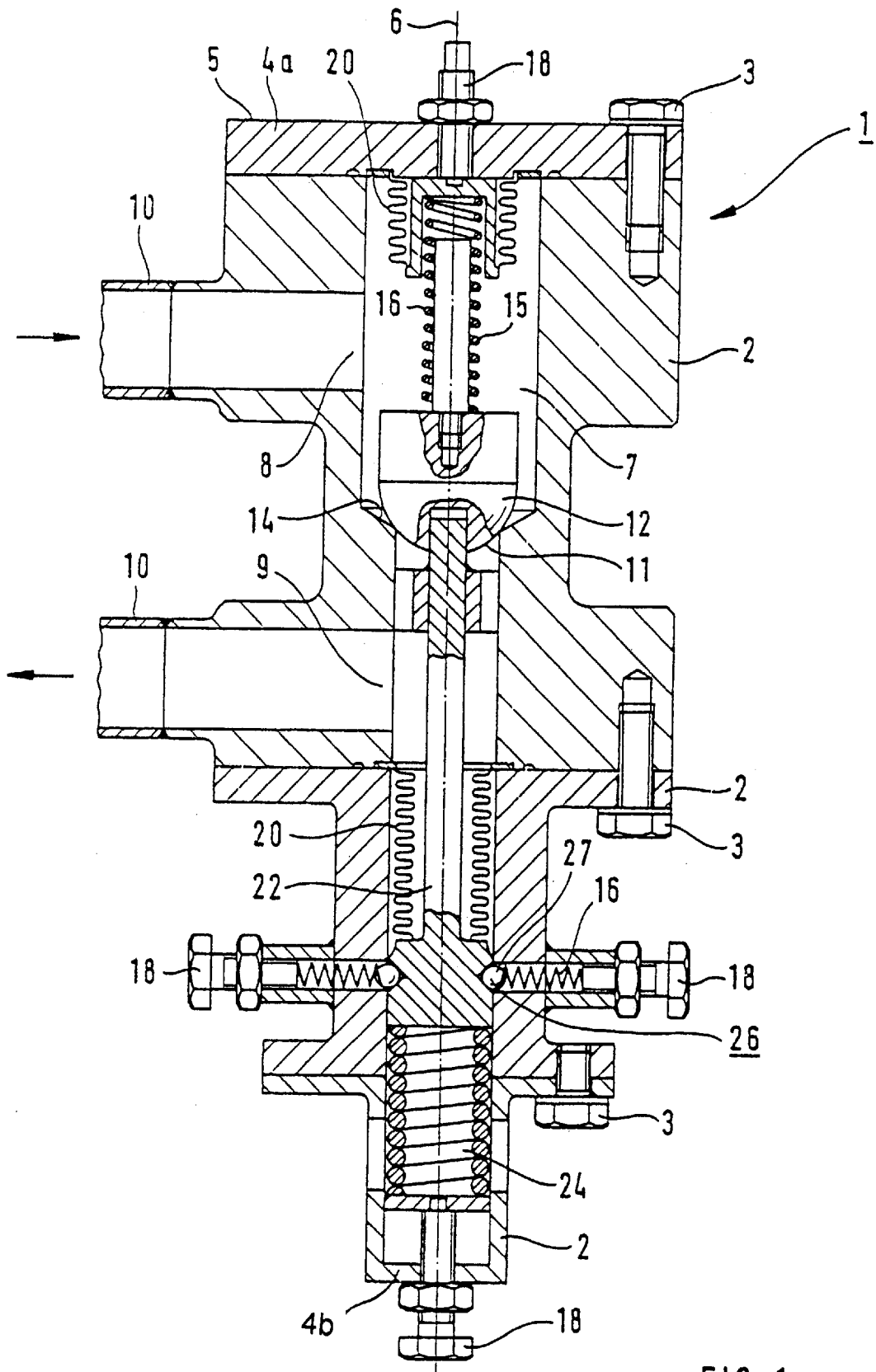
FIG. 1 is a fragmentary, diagrammatic, sectional view showing a structure of a pulse generator.

Referring now to the figures of the drawings in detail and first, particularly, to FIG. 1 thereof, there is seen a pulse generator 1 which has a housing 2 including a plurality of housing parts that are connected to one another by screw connections 3. The housing 2 is delimited on a first end surface 4a by a housing cover 5 which is fastened to the housing 2 by a screw connection 3. Inside, the housing 2 has a cavity, for example a cylindrical cavity 7, which extends along its longitudinal axis 6 between its first end surface 4a and a second end surface 4b. The housing 2 furthermore has a first orifice 8 and a second orifice 9 following the latter in the direction of the longitudinal axis 6. Each of the orifices is connected to the cavity 7, so that a line 10 capable of being connected to the pulse generator 1 is connected through the first and second orifices 8, 9 to the cavity 7. In other words, in this case the pulse generator 1 is disposed in the line 10, that is to say the pulse generator 1 is disposed between two line portions of the line 10. At least part of the cavity 7 may therefore also be considered as a line portion of the line 10.

A first half of the housing 2 is oriented toward the housing cover 5. A closure element 11 for closing or opening the cavity 7 between the first orifice 8 and the second orifice 9, that is to say for closing or opening the line 10, is disposed in the cavity 7. In other words, the closure element 11 is used for closing or opening that line portion of the line 10 which is formed by the cavity 7. The closure element 11, or the entire pulse generator 1, may therefore also be considered as a valve for the line 10.

In the exemplary embodiment of FIG. 1, the closure element 11 includes a sealing ball 12 and a seat 14, with the sealing ball 12 being located in a closed basic position. The sealing ball 12 of the closure element 11 is held in its closing position by a second actuating element 15. According to FIG. 1, the second actuating element 15 is a compression spring 16 which is supported against the housing cover 5. A prestress of the compression spring 16 can be set through a setscrew 18 reaching through the housing cover 5. An orifice in the housing cover 5, that is necessitated by the setscrew 18; is sealed off in a gas-tight manner by a compensator 20, which is a bellows or concertina in the exemplary embodiment. Instead of the compression spring 16, it is also possible to use, for example, a pneumatic pressure element or a hydraulic pressure element.

A temperature-sensitive first actuating element 24, for example a spring in the cavity 7, is disposed in a second half of the housing 2 facing the second end surface 4b. This first actuating element 24 reacts to a temperature change with a volume change, so that the first actuating element 24 moves in the cavity 7 relative to the housing 2. This reversible movement is a contraction of the actuating element 24 in the event of a lowering of temperature and an expansion in the event of an increase in temperature. The reversible movement is transmitted, for example through a rod 22, to the sealing ball 12 of the closure element 11 in order to open or close the latter. A prestress of the first actuating element 24 can be set with another setscrew 18 reaching through the second end surface 4b of the housing 2.

A locking device 26 acting on the rod 22 is disposed between the first actuating element 24 and the closure element 11.

According to FIG. 1, the locking device 26 includes further compression springs 16 which in each case press a ball 27 into a recess provided for this purpose in the rod 22. A prestress of the compression springs 16 may likewise be set in each case by further setscrews 18 disposed laterally on the housing 2.

The first orifice 8 therefore opens into the cavity 7 between the closure element 11 and the housing cover 5 and the second orifice 9 opens into the cavity 7 between the closure element 11 and the first actuating element 24. The closure element 11 is disposed between the two orifices 8, 9, to which the line 10 is connected. With the closure element opened, that is to say when the sealing ball 12 is in an open position, a fluid medium, for example compressed air, can therefore flow through the pulse generator or control fitting 1 through the line 10. In order to avoid an undesirable escape of the fluid medium from the pulse generator 1, the cavity 7 is sealed off in a gas-tight manner toward the first actuating element 24, between the closure element 11 and the latter, below the line 10, by a further compensator 20, which is a bellows or concertina in the exemplary embodiment.

The pulse generator 1 is advantageously disposed in a chamber, so that a temperature increase in that chamber can be detected and so that a signal can be transmitted to a downstream unit through the pressure-carrying line 10. A force takes effect on the sealing ball 12 as a result of the expansion or contraction of the first actuating element 24 in the event of a respective increase in temperature and lowering of temperature. If, for example, the temperature in the chamber rises, the first actuating element 24 expands and opens the closure element 11. In other words, as a result of a force locking connection made between the first actuating element 24 and the sealing ball 12 through the rod 22 during expansion, the first actuating element releases the sealing ball from its seat 14, so that the pressure-carrying line 10 is released and compressed air can flow through the line 10. A force-locking connection is one which connects two elements together by force external to the elements, as opposed to a form-locking connection which is provided by the shapes of the elements themselves. The pulse generator 1 may therefore be referred to as a temperature-sensitive passive pulse generator 1 which, in the event of a temperature change in its vicinity, transmits a pulse to a downstream unit passively, that is to say without any external control influence.

In order to ensure that the control fitting 1 only releases the line 10 at a fixed temperature, a force necessary to open the closure element 11 can be set. A temperature beyond which the pulse generator 1 is to be triggered is set indirectly through an adjustable force. For this purpose, on one hand, the sealing ball 12 is pressed into its seat 14 by the compression spring 16, the prestress of which can be set through the set screw 18. On the other hand, the force necessary for releasing the locking device 26 os set through the use of the further compression springs 16 taking effect on the balls 27. The prestress of these further compression springs 16 may be set in each case through a further setscrew 18. Through the use of this locking device 26, the first actuating element 24 is held, as seen in FIG. 1, in a fixed, unchanged basic position even in the event of minor temperature fluctuations around a non-critical normal temperature. In addition, the prestress of the first actuating element 24 may likewise be set through the other setscrew 18.

Advantageously, a memory pressure element, for example a memory compression spring, is used as the first actuating element 24. Such a memory pressure element only expands appreciably beyond a specific temperature, so that the control fitting 1 as a whole closes the pressure-carrying line 10 up to a desired temperature and releases the line 10 quickly and essentially completely above that temperature.

Figure 2:
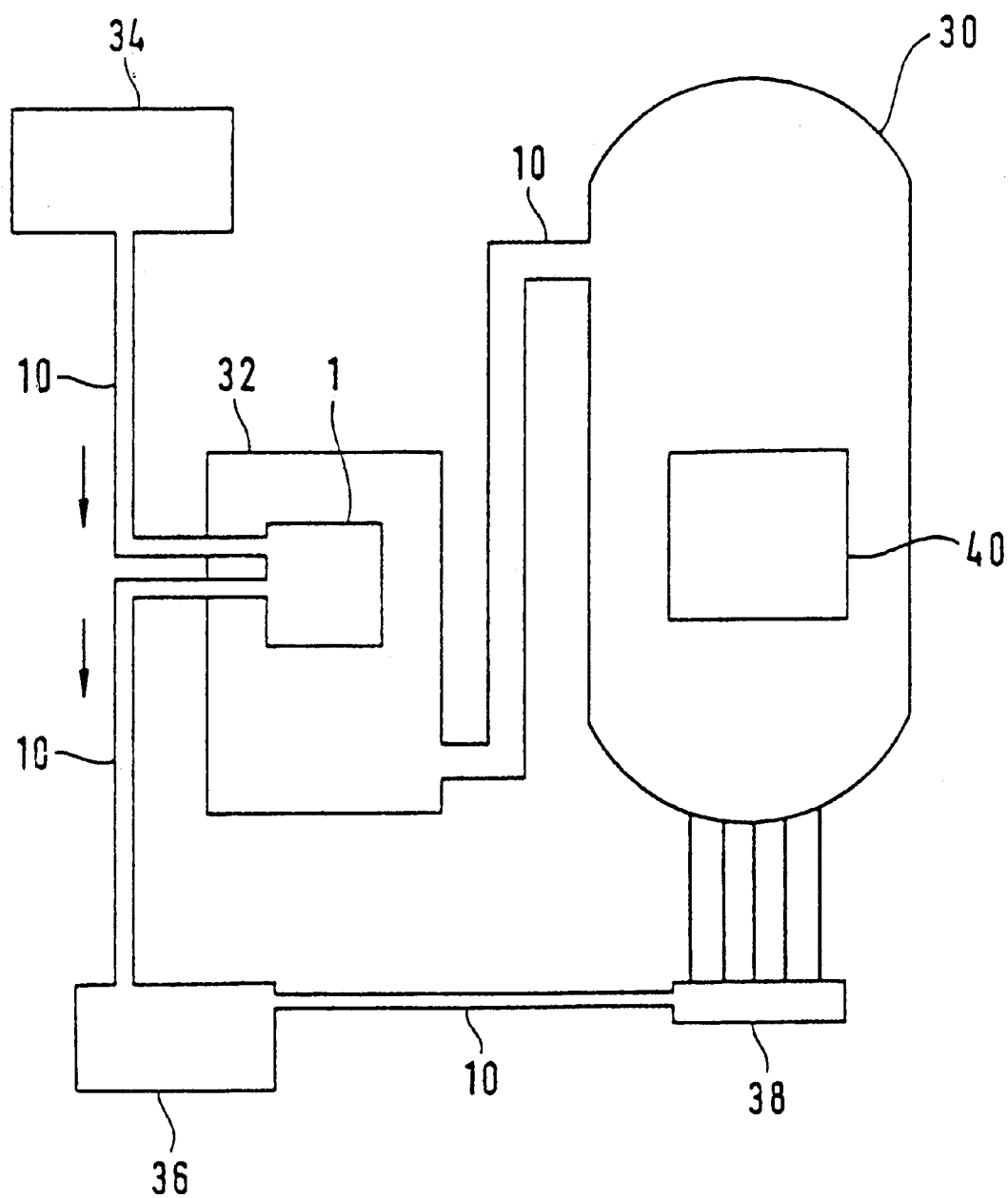
FIG. 2 is a greatly simplified circuit diagram showing a configuration of the pulse generator in a nuclear power plant.

According to FIG. 2, a reactor pressure vessel 30 is connected through a line 10 to a chamber, for example a condensation chamber 32. A pulse generator 1 is disposed inside the condensation chamber 32. A pressure-carrying line 10 is connected to the pulse generator 1. Compressed air is fed into the line 10, for example from a compressed air accumulator 34. The line 10 is connected, after the pulse generator 1, to a downstream unit, for example a fitting 36. In other words, the pulse generator 1 is inserted between the compressed air accumulator 34 and the fitting 36 and closes and opens the pressure-carrying line 10. When the control fitting 1 releases the line 10 as a result of a temperature rise in the condensation chamber 32, the fitting 36 receives a signal and thereupon causes the entire plant to be put into a safe operating state or a shutdown state. As an example of this, according to FIG. 2, the fitting 36 is connected through a line 10 to a control rod drive 38 of the reactor pressure vessel 30, in order to regulate power generated in a reactor core 40.

I claim:

1. In a nuclear power plant having a safety fitting and a line connected to the safety fitting, a passive pulse generator to be connected to the line for activating the safety fitting, the passive pulse generator comprising:

a closure element for reversibly opening and closing the line;

an actuating element generating a force effect as a result of a thermal volume change of said actuating element, said actuating element supplying the force effect for actuating said closure element; and a locking device holding said actuating element in a basic position as lone as the force effect is below a predetermined value and releasing an actuation of said closure element by said actuating element when the force effect caused by the thermal volume change exceeds said predeterminable value.

2. The passive pulse generator according to claim 1, wherein said actuating element is a memory pressure element.

3. The passive pulse generator according to claim 1, including another actuating element for closing said closure element with an adjustable closing force.

4. In a nuclear power plant having at least one of a pressure chamber and a condensation chamber, a safety fitting and a line connected to the safety fitting, a passive pulse generator disposed in one of the chambers for connection to the line to activate the safety fitting, the passive pulse generator comprising:

a closure element for reversibly opening and closing the line;

an actuating element generating a force effect as a result of a thermal volume change of said actuating element, said actuating element supplying the force effect for actuating said closure element; and a locking device holding said actuating element in a basic position as long as the force effect is below a predetermined value and releasing an actuation of said closure element by said actuating element when the force effect caused by the thermal volume change exceeds the predeterminable value.

5. In a method for activating a safety fitting in a nuclear power plant with a passive pulse generator transmitting a signal through a pressure-carrying line to the fitting, the improvement which comprises:

generating a force effect from a thermal volume change of an actuating element in the pulse generator;

holding the actuating element in a basic position with a locking device as long as the force effect is below a predetermined value;

actuating a closure element in the pulse generator with the force effect for reversibly opening and closing the pressure-carrying line; and releasing the actuation of the closure element by the actuating element with said locking device, when the force effect caused by the thermal volume change exceeds the predeterminable value.

6. The method according to claim 5, which comprises placing the pulse generator in at least one of a pressure chamber and a condensation chamber of the nuclear power plant.

7. The passive pulse generator according to claim 1, including a rod with a recess connecting said actuating element with said closure element, said locking device engaging into said recess of said rod.

* * * * *